UNITED STATES PATENT OFFICE.

LEOPOLD HESSE, OF VOHWINKEL, NEAR ELBERFELD, GERMANY, ASSIGNOR TO FARBENFABRIKEN VORM. FRIEDR. BAYER & CO., OF ELBERFELD, GERMANY, A CORPORATION OF GERMANY.

WOOL AZO DYE.

1,054,348.     Specification of Letters Patent.     Patented Feb. 25, 1913.

No Drawing.     Application filed July 2, 1912. Serial No. 707,230.

*To all whom it may concern:*

Be it known that I, LEOPOLD HESSE, doctor of philosophy, chemist, citizen of the German Empire, residing at Vohwinkel, near Elberfeld, Germany, have invented new and useful Improvements in Wool Azo Dye, of which the following is a specification.

I have found that new and valuable monoazo dyestuffs for wool fast to washing can be obtained by combining diazo compounds of the naphthalene series, such as diazotized naphthylamins, aminonaphthols or their sulfonic acids with alkyl-benzyl-meta-toluidin-sulfonic acids. The dyes have most probably the formula:

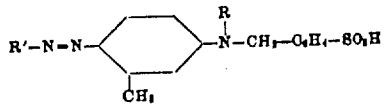

(R=alkyl; R'=a radical of the naphthalene series, such as

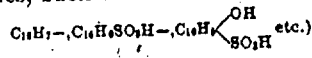

The new dyes thus obtained are after being dried and pulverized in the shape of their alkaline salts from yellow to red powder soluble in water. They yield upon reduction with stannous chlorid and hydrochloric acid a naphthylamin compound and 3-methyl-4-amino-1-alkyl-benzyl-anilin-sulfonic acid:

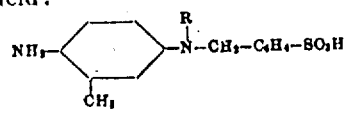

They dye wool from acid baths from yellow to violet shades fast to washing.

The following example may illustrate my invention; the parts being by weight:—223 parts of 1.5-naphthylamin sulfonic acid are diazotized with 69 parts of sodium nitrite and 280 parts of hydrochloric acid (30 per cent.) The diazo compound thus obtained is then added to a solution of 327 parts of thylbenzyl-meta-toluidin-sulfonic acid (sodium salt) and 180 parts of calcined soda in 8000 parts of water. The dye is salted out with common salt, filtered off and dried.

The new dye having most probably the formula:

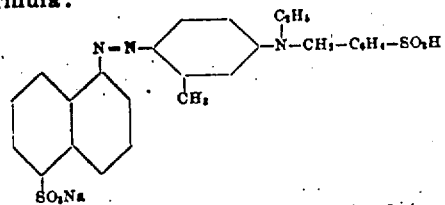

is after being dried and pulverized in the shape of its sodium salt an orange powder easily soluble in water with an orange coloration, soluble in concentrated sulfuric acid with a red coloration. It yields upon reduction with stannous chlorid and hydrochloric acid 1-napthylamin-5-sulfonic acid and 3-methyl-4-amino-1-ethylbenzylanilin-sulfonic acid. It dyes wool an orange-red.

Other diazo compounds may be used e. g. the diazo compounds of 4'-toluidin-2'-sulfonyl-1-naphthylamin-5-sulfonic acid, 1-naphthlylamin-2- or 4-sulfonic acid, 2-naphthylamin-4.8-disulfonic acid, 1.8-aminonaphthol-3.6-disulfonic acid, acetyl-1.4-napththylendiamin-6-sulfonic acid etc. or other alkyl-benzyl-meta-toluidin-sulfonic acids e. g. the methyl-benzyl-meta-toluidin-sulfonic acid.

For the purpose it is to be assumed that any product which may be obtained from a diazotized naphthylamin compound and an alkyl-benzyl-toluidin-sulfonic acid contains the generic formula:

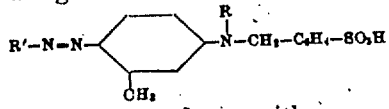

such being in accordance with my present understanding as a chemist and such being the generic scope of the patent.

I claim:—

1. The herein described new monoazo dyestuffs having probably the general formula:

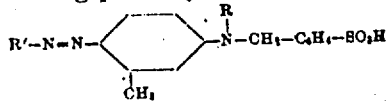

(R'=a radical of the naphthalene series, R=an alkyl) which dyes are after being dried and pulverized in the shape of their alkaline salts from yellow to red powders soluble in water: yielding upon reduction with stannous chlorid and hydrochloric acid a naphthylamin compound and 3-methyl-4-amino-1-alkyl-benzyl-anilin-sulfonic acid and dyeing wool from acid baths from yellow to violet shades fast to washing, substantially as described.

2. The herein described new monoazo dyestuff having most probably the formula:

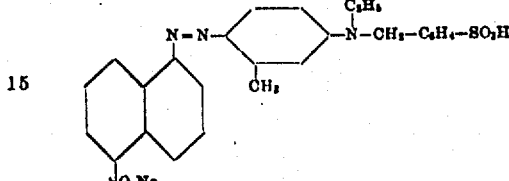

which dye is after being dried and pulverized in the shape of its sodium salt an orange powder easily soluble in water with an orange coloration, soluble in concentrated sulfuric acid with a red coloration; yielding upon treatment with stannous chlorid and hydrochloric acid 1-naphthylamin-5-sulfonic acid and 3-methyl-4-amino-1-ethyl-benzyl-anilin-sulfonic acid and dyeing wool from acid baths orange to red shades fast to washing, substantally as described.

In testimony whereof I have hereunto set my hand in the presence of two subscribing witnesses.

LEOPOLD HESSE. [L. S.]

Witnesses:
HELEN NUFER,
ALBERT NUFER.

Copies of this patent may be obtained for five cents each, by addressing the "Commissioner of Patents, Washington, D. C."

---

Corrections in Letters Patent No. 1,054,348.

It is hereby certified that in Letters Patent No. 1,054,348, granted February 25, 1913, upon the application of Leopold Hesse, of Vohwinkel, near Elberfeld, Germany, for an improvement in "Wool Azo Dye," errors appear in the printed specification requiring correction as follows: Page 1, line 13, for the word "alky" read *alkyl;* same page, line 23, in formula, for the symbols "$C_{16}H_9SO_3H$" read *$C_{10}H_6SO_3H$;* same page, lines 28–29, for the word "powder" read *powders*, and line 47, for the word "thylbenzyl" read *ethylbenzyl;* and that the said Letters Patent should be read with these corrections therein that the same may conform to the record of the case in the Patent Office.

Signed and sealed this 6th day of May, A. D., 1913.

[SEAL.]

C. C. BILLINGS,
*Acting Commissioner of Patents.* dried and pulverized in the shape of their alkaline salts from yellow to red powders soluble in water: yielding upon reduction with stannous chlorid and hydrochloric acid a naphthylamin compound and 3-methyl-4-amino-1-alkyl-benzyl-anilin-sulfonic acid and dyeing wool from acid baths from yellow to violet shades fast to washing, substantially as described.

2. The herein described new monoazo dyestuff having most probably the formula:

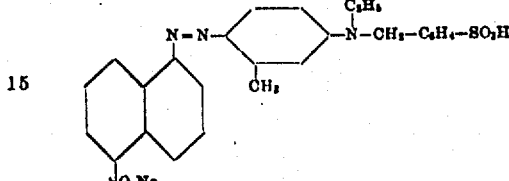

which dye is after being dried and pulverized in the shape of its sodium salt an orange powder easily soluble in water with an orange coloration, soluble in concentrated sulfuric acid with a red coloration; yielding upon treatment with stannous chlorid and hydrochloric acid 1-naphthylamin-5-sulfonic acid and 3-methyl-4-amino-1-ethyl-benzyl-anilin-sulfonic acid and dyeing wool from acid baths orange to red shades fast to washing, substantally as described.

In testimony whereof I have hereunto set my hand in the presence of two subscribing witnesses.

LEOPOLD HESSE. [L. S.]

Witnesses:
HELEN NUFER,
ALBERT NUFER.

Copies of this patent may be obtained for five cents each, by addressing the "Commissioner of Patents, Washington, D. C."

---

Corrections in Letters Patent No. 1,054,348.

It is hereby certified that in Letters Patent No. 1,054,348, granted February 25, 1913, upon the application of Leopold Hesse, of Vohwinkel, near Elberfeld, Germany, for an improvement in "Wool Azo Dye," errors appear in the printed specification requiring correction as follows: Page 1, line 13, for the word "alky" read *alkyl;* same page, line 23, in formula, for the symbols "$C_{16}H_9SO_3H$" read *$C_{10}H_6SO_3H$;* same page, lines 28–29, for the word "powder" read *powders*, and line 47, for the word "thylbenzyl" read *ethylbenzyl;* and that the said Letters Patent should be read with these corrections therein that the same may conform to the record of the case in the Patent Office.

Signed and sealed this 6th day of May, A. D., 1913.

[SEAL.]

C. C. BILLINGS,
*Acting Commissioner of Patents.*

Corrections in Letters Patent No. 1,054,348.

It is hereby certified that in Letters Patent No. 1,054,348, granted February 25, 1913, upon the application of Leopold Hesse, of Vohwinkel, near Elberfeld, Germany, for an improvement in "Wool Azo Dye," errors appear in the printed specification requiring correction as follows: Page 1, line 18, for the word "alky" read *alkyl;* same page, line 23, in formula, for the symbols "$C_{16}H_9SO_3H$" read *$C_{10}H_6SO_3H;$* same page, lines 28-29, for the word "powder" read *powders*, and line 47, for the word "thylbenzyl" read *ethylbenzyl;* and that the said Letters Patent should be read with these corrections therein that the same may conform to the record of the case in the Patent Office.

Signed and sealed this 6th day of May, A. D., 1913.

[SEAL.]                C. C. BILLINGS,

*Acting Commissioner of Patents.*